United States Patent
Olien

(10) Patent No.: US 7,198,137 B2
(45) Date of Patent: Apr. 3, 2007

(54) SYSTEMS AND METHODS FOR PROVIDING HAPTIC FEEDBACK WITH POSITION SENSING

(75) Inventor: Neil T. Olien, Montreal (CA)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 10/902,462

(22) Filed: Jul. 29, 2004

(65) Prior Publication Data

US 2006/0021828 A1 Feb. 2, 2006

(51) Int. Cl.
*F16D 66/00* (2006.01)
*B60L 7/00* (2006.01)

(52) U.S. Cl. .................. 188/1.11 E; 188/164; 188/161

(58) Field of Classification Search ................. 188/267, 188/267.1, 267.2, 156, 158, 159, 160, 161, 188/163, 164, 166, 171; 345/156, 161, 163, 345/167, 184, 165; 715/701, 702
See application file for complete search history.

(56) References Cited

U.S. PATENT DOCUMENTS

| | | | |
|---|---|---|---|
| 3,157,853 A | 11/1964 | Hirsch | |
| 3,198,293 A | 8/1965 | Mathews | |
| 3,220,121 A | 11/1965 | Cutler | |
| 3,497,668 A | 2/1970 | Hirsch | |
| 3,517,446 A | 6/1970 | Corlyon et al. | |
| 3,795,150 A | 3/1974 | Eckhardt | |
| 3,812,936 A | 5/1974 | Dane | |
| 3,902,687 A | 9/1975 | Hightower | |
| 3,903,614 A | 9/1975 | Diamond et al. | |
| 4,160,508 A | 7/1979 | Salsbury, Jr. | |
| 4,236,325 A | 12/1980 | Hall et al. | |
| 4,262,240 A | 4/1981 | Arai | |
| 4,400,790 A | 8/1983 | Chambers et al. | |
| 4,513,235 A | 4/1985 | Acklam et al. | |

(Continued)

FOREIGN PATENT DOCUMENTS

EP 0111992 6/1984

(Continued)

OTHER PUBLICATIONS

Adelstein, "Design and Implementation of a Force Reflecting Manipulandum for Manual Control research," DSC-vol. 42, Advances in Robotics, Edited by H. Kazerooni, pp. 1-12, 1992.

(Continued)

*Primary Examiner*—Thomas Williams
(74) *Attorney, Agent, or Firm*—Kilpatrick Stockton LLP

(57) ABSTRACT

Systems and methods for providing haptic feedback with position sensing are described. In one described system, a first and second brake surfaces are configured to contact each other. An actuator may be configured to exert a force on at least one of the first and second brake surfaces in order to produce a haptic effect. The actuator comprises an actuator surface. The actuator surface defines a cavity configured to receive a sensing device. The first brake surface may comprise a coding from which the sensing device can sense relative movement of the first brake surface with respect to the sensing device. The described system may comprise a processor in communication with the actuator and the sensing device to control the actuator in providing the haptic effects.

43 Claims, 5 Drawing Sheets

U.S. PATENT DOCUMENTS

| | | | |
|---|---|---|---|
| 4,553,080 | A | 11/1985 | Cannon et al. |
| 4,560,983 | A | 12/1985 | Williams |
| 4,581,491 | A | 4/1986 | Boothroyd |
| 4,599,070 | A | 7/1986 | Hladky et al. |
| 4,652,805 | A | 3/1987 | Kohn |
| 4,706,294 | A | 11/1987 | Ouchida |
| 4,708,656 | A | 11/1987 | De Vries et al. |
| 4,713,007 | A | 12/1987 | Alban |
| 4,758,165 | A | 7/1988 | Tieman et al. |
| 4,823,106 | A | 4/1989 | Lovell |
| 4,859,922 | A | 8/1989 | Tauchenitz et al. |
| 4,868,549 | A | 9/1989 | Affinito et al. |
| 4,891,764 | A | 1/1990 | McIntosh |
| 4,930,770 | A | 6/1990 | Baker |
| 4,934,694 | A | 6/1990 | McIntosh |
| 4,947,097 | A | 8/1990 | Tao |
| 5,019,761 | A | 5/1991 | Kraft |
| 5,022,407 | A | 6/1991 | Horch et al. |
| 5,035,242 | A | 7/1991 | Franklin |
| 5,038,089 | A | 8/1991 | Szakaly |
| 5,078,152 | A | 1/1992 | Bond |
| 5,086,296 | A | 2/1992 | Clark |
| 5,116,051 | A | 5/1992 | Moncrief et al. |
| 5,116,180 | A | 5/1992 | Fung et al. |
| 5,185,561 | A | 2/1993 | Good et al. |
| 5,186,695 | A | 2/1993 | Mangseth et al. |
| 5,187,630 | A | 2/1993 | MacKay et al. |
| 5,189,355 | A | 2/1993 | Larkins et al. |
| 5,191,320 | A | 3/1993 | MacKay |
| 5,212,473 | A | 5/1993 | Louis |
| 5,220,260 | A | 6/1993 | Schuler |
| 5,240,417 | A | 8/1993 | Smithson et al. |
| 5,270,689 | A | 12/1993 | Hermann |
| 5,271,290 | A | 12/1993 | Fischer |
| 5,275,174 | A | 1/1994 | Cook |
| 5,299,810 | A | 4/1994 | Pierce |
| 5,309,140 | A | 5/1994 | Everett |
| 5,334,027 | A | 8/1994 | Wherlock |
| 5,368,484 | A | 11/1994 | Copperman et al. |
| 5,381,080 | A | 1/1995 | Schnell et al. |
| 5,382,373 | A | 1/1995 | Carlson et al. |
| 5,396,266 | A | 3/1995 | Brimhall |
| 5,466,213 | A | 11/1995 | Hogan |
| 5,492,312 | A | 2/1996 | Carlson |
| 5,542,672 | A | 8/1996 | Meredith |
| 5,547,382 | A | 8/1996 | Yamasaki |
| 5,559,432 | A | 9/1996 | Logue |
| 5,577,581 | A | 11/1996 | Eberwein et al. |
| 5,578,238 | A | 11/1996 | Weiss et al. |
| 5,580,249 | A | 12/1996 | Jacobsen et al. |
| 5,591,082 | A | 1/1997 | Jensen et al. |
| 5,665,946 | A | 9/1997 | Nishijima et al. |
| 5,683,615 | A | 11/1997 | Munoz |
| 5,705,085 | A | 1/1998 | Munoz et al. |
| 5,711,746 | A | 1/1998 | Carlson |
| 5,714,978 | A | 2/1998 | Yamanaka et al. |
| 5,721,566 | A | 2/1998 | Rosenberg et al. |
| 5,730,655 | A | 3/1998 | Meredith |
| 5,766,016 | A | 6/1998 | Sinclair |
| 5,767,836 | A | 6/1998 | Scheffer et al. |
| 5,767,839 | A | 6/1998 | Rosenberg |
| 5,781,172 | A | 7/1998 | Engel et al. |
| 5,785,630 | A | 7/1998 | Bobick et al. |
| 5,816,105 | A | 10/1998 | Adelstein |
| 5,816,823 | A | 10/1998 | Naimark et al. |
| 5,914,705 | A | 6/1999 | Johnson et al. |
| 5,944,151 | A | 8/1999 | Jakobs et al. |
| 6,002,184 | A | 12/1999 | Delson et al. |
| 6,008,800 | A | 12/1999 | Pryor |
| 6,087,829 | A | 7/2000 | Jager |
| 6,100,476 | A | 8/2000 | Adamietz et al. |
| 6,111,577 | A | 8/2000 | Zilles et al. |
| 6,128,006 | A | 10/2000 | Rosenberg et al. |
| 6,147,422 | A | 11/2000 | Delson et al. |
| 6,154,201 | A | 11/2000 | Levin et al. |
| 6,211,861 | B1 | 4/2001 | Rosenberg et al. |
| 6,215,470 | B1 | 4/2001 | Rosenberg et al. |
| 6,219,034 | B1 | 4/2001 | Elbing et al. |
| 6,243,078 | B1 | 6/2001 | Rosenberg |
| 6,262,717 | B1 | 7/2001 | Donohue et al. |
| 6,271,828 | B1 | 8/2001 | Rosenberg et al. |
| 6,271,833 | B1 | 8/2001 | Rosenberg et al. |
| 6,271,834 | B1 | 8/2001 | May et al. |
| 6,283,859 | B1 | 9/2001 | Carlson et al. |
| 6,307,285 | B1 | 10/2001 | Delson et al. |
| 6,315,088 | B1 | 11/2001 | Gustin et al. |
| 6,337,678 | B1 | 1/2002 | Fish |
| 6,348,772 | B1 | 2/2002 | May |
| 6,373,465 | B2 | 4/2002 | Jolly et al. |
| 6,394,239 | B1 | 5/2002 | Carlson |
| 6,400,352 | B1 | 6/2002 | Bruneau et al. |
| 6,420,806 | B2 | 7/2002 | Wittig |
| 6,422,941 | B1 | 7/2002 | Thorner et al. |
| 6,468,158 | B1 | 10/2002 | Ootori et al. |
| 6,480,752 | B1 | 11/2002 | Blume et al. |
| 6,486,872 | B2 | 11/2002 | Rosenberg et al. |
| 6,589,117 | B1 | 7/2003 | Moritome et al. |
| 6,591,175 | B2 | 7/2003 | Numata et al. |
| RE38,242 | E | 9/2003 | Engel et al. |
| 6,613,997 | B2 | 9/2003 | Oster et al. |
| 6,636,202 | B2 | 10/2003 | Ishmael, Jr. et al. |
| 6,637,311 | B2 | 10/2003 | Barden |
| 6,640,940 | B2 | 11/2003 | Carlson |
| 6,646,632 | B2 | 11/2003 | Wegmuller et al. |
| 6,854,573 | B2 * | 2/2005 | Jolly et al. ............... 188/267 |
| 6,864,620 | B2 * | 3/2005 | Takeuchi et al. ............ 310/334 |
| 2001/0052893 | A1 | 12/2001 | Jolly et al. |
| 2002/0044132 | A1 | 4/2002 | Fish |
| 2002/0067336 | A1 | 6/2002 | Wegmuller et al. |
| 2002/0084983 | A1 | 7/2002 | Boldy |
| 2002/0158842 | A1 | 10/2002 | Guy et al. |
| 2003/0006958 | A1 | 1/2003 | Onodera |
| 2003/0038774 | A1 | 2/2003 | Piot et al. |
| 2003/0079948 | A1 | 5/2003 | Jolly et al. |
| 2003/0080939 | A1 | 5/2003 | Kobayashi |
| 2003/0184518 | A1 | 10/2003 | Numata et al. |
| 2004/0040800 | A1 | 3/2004 | Anastas et al. |
| 2004/0084567 | A1 | 5/2004 | Bailey |
| 2004/0206611 | A1 * | 10/2004 | Kobayashi ............... 200/10 |

FOREIGN PATENT DOCUMENTS

| | | |
|---|---|---|
| EP | 0349086 | 1/1990 |
| EP | 0640902 A2 | 3/1995 |
| JP | 01-003664 | 7/1990 |
| JP | 02-109714 | 1/1992 |
| JP | 04-007371 | 8/1993 |
| JP | 05-193862 | 1/1995 |

OTHER PUBLICATIONS

Adelstein, "A Virtual Environment System For The Study of Human Arm Tremor," Ph.D. Dissertation, Dept. of Mechanical Engineering, MIT, Jun. 1989.

Aukstakalnis et al., "Silicon Mirage: The Art and Science of Virtual Reality," ISBN 0-938151-82-7, pp. 129-180, 1992.

Badescu, "Rotary Haptic Knob for Vehicular Instrument Controls," Proceedings of the 10th Symp. On Haptic Interfaces For Virtual Envir. & Teleoperator Systs. (HAPTICS'01), 2002.

Baigrie, "Electric Control Loading—A Low Cost, High Performance Alternative," Proceedings, pp. 247-254, Nov. 6-8, 1990.

Bejczy et al., "A Laboratory Breadboard System For Dual-Arm Teleoperation," SOAR '89 Workshop, JSC, Houston, TX, Jul. 25-27, 1989.

Bejczy et al., "Kinesthetic Coupling Between Operator and Remote Manipulator," International Computer Technology Conference, The American Society of Mechanical Engineers, San Francisco, CA, Aug. 12-15, 1980.

Bejczy, "Generalization of Bilateral Force-Reflecting Control of Manipulators," Proceedings Of Fourth CISM-IFToMM, Sep. 8-12, 1981.

Bejczy, "Sensors, Controls, and Man-Machine Interface for Advanced Teleoperation," Science, vol. 208, No. 4450, pp. 1327-1335, 1980.

Bejczy, et al., "Universal Computer Control System (UCCS) For Space Telerobots," CH2413-3/87/0000/0318501.00 1987 IEEE, 1987.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Burdea et al., "Distributed Virtual Force Feedback, Lecture Notes for Workshop on Force Display in Virtual Environments and its Application to Robotic Teleoperation," 1993 IEEE International Conference on Robotics and Automotion, pp. 25-44, May 2, 1993.

Caldwell et al., "Enhanced Tactile Feedback (Tele-Taction) Using a Multi-Functional Sensory System," 1050-4729/93, pp. 955-960, 1993.

Colgate, J. Edward, et al., "Implementation of Stiff Virtual Walls in Force-Reflecting Interfaces," Department of Mechanical Engineering, Northwestern University, Evanston, IL, Sep. 1993.

"Cyberman Technical Specification," Logitech Cyberman SWIFT Supplement, Apr. 5, 1994.

Eberhardt et al., "Including Dynamic Haptic Perception by The Hand: System Description and Some Results," DSC-vol. 55-1, Dynamic Systems and Control: vol. 1, ASME 1994.

Eberhardt et al., "OMAR—A Haptic display for speech perception by deaf and deaf-blind individuals," IEEE Virtual Reality Annual International Symposium, Seattle, WA, Sep. 18-22, 1993.

Gobel et al., "Tactile Feedback Applied to Computer Mice," International Journal of Human-Computer Interaction, vol. 7, No. 1, pp. 1-24, 1995.

Gotow et al., "Controlled Impedance Test Apparatus for Studying Human Interpretation of Kinesthetic Feedback," WA11-11:00, pp. 332-337.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

IBM Technical Disclosure Bullein, "Mouse Ball-Actuating Device With Force and Tactile Feedback," vol. 32, No. 9B, Feb. 1990.

IWATA, "Pen-based Haptic Virtual Environment," 0-7803-1363-1/93 IEEE, pp. 287-292, 1993.

Jacobsen et al., "High Performance, Dextrous Telerobotic Manipulator With Force Reflection," Intervention/ROV '91 Conference & Exposition, Hollywood, Florida, May 21-23, 1991.

Jones et al., "A perceptual analysis of stiffness," ISSN 0014-4819 Springer International (Springer-Verlag); Experimental Brain Research, vol. 79, No. 1, pp. 150-156, 1990.

Kaczmarek et al., "Tactile Displays," Virtual Environment Technologies.

Kontarinis et al., "Display of High-Frequency Tactile Information to Teleoperators," Telemanipulator Technology and Space Telerobotics, Won S. Kim, Editor, Proc. SPIE vol. 2047, pp. 40-50, Sep. 7-9, 1993.

Marcus, "Touch Feedback in Surgery," Proceedings of Virtual Reality and Medicine The Cutting Edge, Sep. 8-11, 1994.

Mcaffee, "Teleoperator Subsystem/Telerobot Demonstrator: Force Reflecting Hand Controller Equipment Manual," JPL D-5172, pp. 1-50, A1-A36, B1-B5, C1-C36, Jan. 1988.

Minsky, "Computational Haptics: The Sandpaper System for Synthesizing Texture for a Force-Feedback Display," Ph.D. Dissertation, MIT, Jun. 1995.

Ouhyoung et al., "The Development of A Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Ouh-Young, "Force Display in Molecular Docking," Order No. 9034744, p. 1-369, 1990.

Ouh-Young, "A Low-Cost Force Feedback Joystick and Its Use in PC Video Games," IEEE Transactions on Consumer Electronics, vol. 41, No. 3, Aug. 1995.

Patrick et al., "Design and Testing of A Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Pimentel et al., "Virtual Reality: through the new looking glass," 2nd Edition; McGraw-Hill, ISBN 0-07-050167-X, pp. 41-202, 1994.

Rabinowitz et al., "Multidimensional tactile displays: Identification of vibratory intensity, frequency, and contactor area," Journal of The Acoustical Society of America, vol. 82, No. 4, Oct. 1987.

Russo, "Controlling Dissipative Magnetic Particle Brakes in Force Reflective Devices," DSC-vol. 42, Advances in Robotics, pp. 63-70, ASME 1992.

Russo, "The Design and Implementation of a Three Degree of Freedom Force Output Joystick," MIT Libraries Archives Aug. 14, 1990, pp. 1-131, May 1990.

Scannell, "Taking a Joystick Ride," Computer Currents, Boston Edition, vol. 9, No. 11, Nov. 1994.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

Snow et al., "Model-X Force-Reflecting-Hand-Controller," NT Control No. MPO-17851; JPL Case No. 5348, pp. 1-4, Jun. 15, 1989.

Stanley et al., "Computer Simulation of Interacting Dynamic Mechanical Systems Using Distributed Memory Parallel Processors," DSC-vol. 42, Advances in Robotics, pp. 55-61, ASME 1992.

Tadros, "Control System Design for a Three Degree of Freedom Virtual Environment Simulator Using Motor/Brake Pair Actuators", MIT Archive © Massachusetts Institutue of Technology, pp. 1-88, Feb. 1990.

Terry et al., "Tactile Feedback In A Computer Mouse," Proceedings of Fourteenth Annual Northeast Bioengineering Conference, University of New Hampshire, Mar. 10-11, 1988.

* cited by examiner

SYSTEMS AND METHODS FOR PROVIDING HAPTIC FEEDBACK WITH POSITION SENSING

RELATED APPLICATIONS

This application relates to, and incorporates by reference herein, application Ser. No. 10/314,400, filed Dec. 8, 2002, entitled "System and Method for Providing Passive Haptic Feedback."

FIELD OF THE INVENTION

The present invention generally relates to user interface devices. The present invention more particularly relates to providing haptic feedback with position sensing to user interface devices.

BACKGROUND

Electronic device manufacturers strive to produce a rich interface for users. Conventional devices utilize visual and auditory cues to provide feedback to a user. In some interface devices, kinesthetic feedback (such as active and resistive force feedback), and/or tactile feedback (such as vibration, texture, and heat), is also provided to the user, more generally known collectively as "haptic feedback." Haptic feedback can provide cues that enhance and simplify the user interface.

A device may incorporate a variety of technologies for providing haptic feedback, comprising both active and resistive devices. Active haptic feedback devices, comprising, for example, devices incorporating motors, generally add energy to a system; resistive devices, such as devices incorporating brakes, generally remove energy from the system.

Conventional resistive actuators may utilize, for example, magnetic particle brakes, magnetorheologic or electrorheologic brakes, or magnetic (non-friction) brakes. Conventional magnetic particle brakes utilize a powder comprising particles of a magnetic material. When a current is applied, the particles line up. Rheologic fluid brakes utilize a fluid that changes viscosity when a current is applied. A magnetic brake generates a magnetic field, and when a piece of metal passes through the magnetic field, an anti-current is generated, causing a resistance to movement of the metal.

SUMMARY

Embodiments of the present invention provide haptic feedback with position sensing. One embodiment of the present invention comprises a first brake surface, a second brake surface configured to contact the first brake surface, and an actuator comprising an actuator surface. The actuator surface defines a cavity configured to receive a sensing device. The actuator may be configured to exert a force on at least one of the first and second brake surfaces to produce a haptic effect. Friction between the first and second brake surfaces may cause a resistance, which can be controlled to deliver haptic effects to a manipulandum. Embodiments of the present invention may be utilized by a broad array of devices, such as cell phones, personal digital assistants, cameras, camcorders, MP3 players, and other electronic devices.

This embodiment is mentioned not to limit or define the invention, but to provide an example of an embodiment of the invention to aid understanding thereof. Illustrative embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Figure 1:
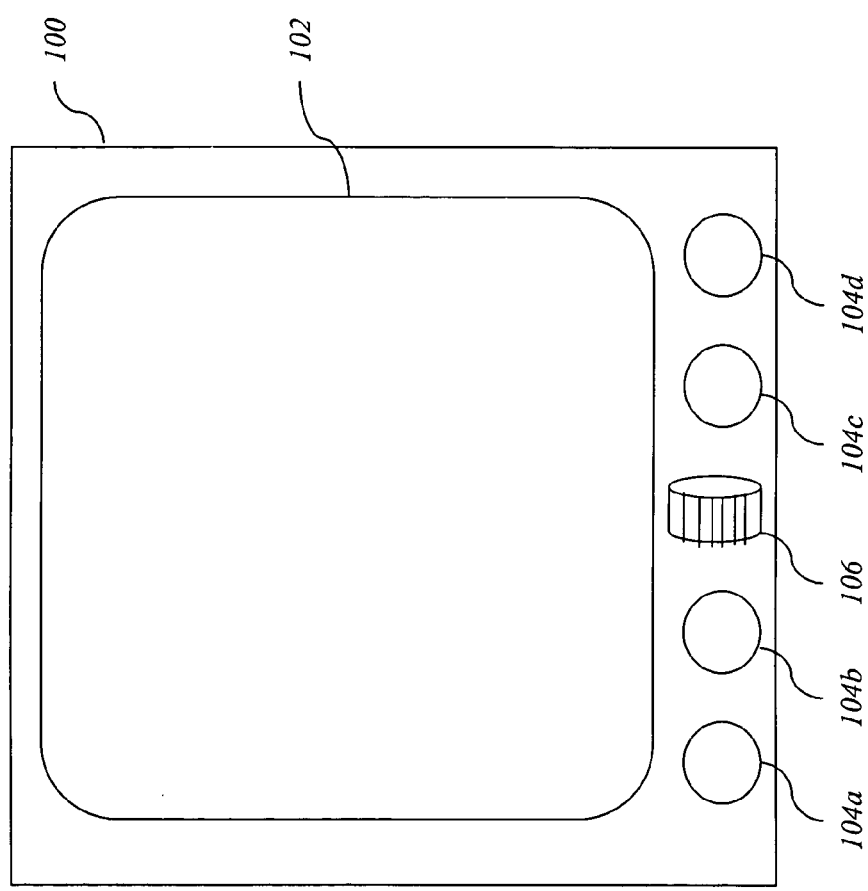
FIG. 1 illustrates a personal digital assistant incorporating one embodiment of the present invention.

Embodiments of the present invention provide systems and methods for providing haptic feedback with position sensing. Referring now to the drawings in which like numerals indicate like elements throughout the several figures, FIG. 1 illustrates a personal digital assistant incorporating one embodiment of the present invention. The personal digital assistant (PDA) 100 shown in FIG. 1 comprises a display screen 102 and several manipulanda, interface elements that a user of the PDA 100 can manipulate (in other embodiments, one manipulandum may be used). The manipulanda shown comprise a plurality of buttons 104a, 104b, 104c, 104d and a scroll wheel 106. In one embodiment, the user may utilize the buttons 104a–d to access specific applications, such as an address book. Once the user has accessed the address book application, the user may utilize the scroll wheel 106 to navigate through the various elements of the user interface, such as menus or a list of names contained in the electronic address book. The embodiment shown in FIG. 1 may provide haptic feedback to the scroll wheel 106 to enhance the user's interaction with the PDA 100. A device according to the present invention may provide haptic feedback in various physical mechanisms, such as the scroll wheel 106 shown in FIG. 1.

Figure 2:
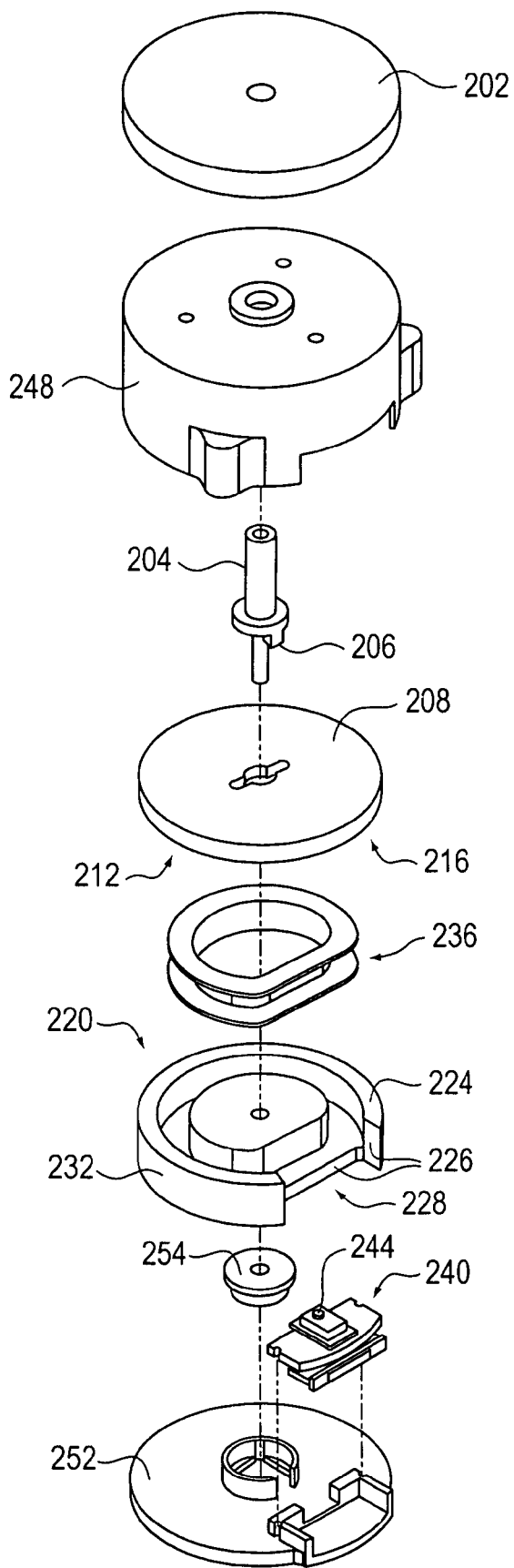
FIG. 2 is an exploded view of a device according to one embodiment of the present invention.

FIG. 2 is an exploded diagram of a manipulandum, a resistive haptic actuator, and a position sensor in one embodiment of the present invention. In the embodiment shown in FIG. 2, the manipulandum comprises a scroll wheel 202. The scroll wheel 202 may comprise, for example, the scroll wheel (106) shown in the PDA (100) of FIG. 1. In other embodiments, the manipulandum may comprise other forms, for example, a trackball, a joystick, a rocker switch, a button, or a knob.

At its center, the scroll wheel 202 shown is connected to a shaft 204. The scroll wheel 202 and shaft 204 rotate around a common axis. A first brake surface 208 in the form of a disk is fixably mounted on the shaft 204. The shaft 204 comprises a key 206. The first brake surface 208 is configured to receive the key 206 of the shaft 204. The first brake surface 208 rotates around the same common axis as the scroll wheel 202 and the shaft 204. Because the first brake surface 208 shown in FIG. 2 is fixably mounted on the shaft 204, the first brake surface 208 rotates with the scroll wheel 202.

The first brake surface 208 in the embodiment shown comprises a magnetic material, such as a steel disk. In other embodiments, the first brake surface 208 may comprise other materials, such as non-metallic materials such as polymers, and may comprise other shapes, such as rectangular, triangular, or polygonal. The first brake surface 208 shown is not moveable towards the scroll wheel 202 axially along the shaft 204, nor is the first brake surface 208 free to rotate independently from the scroll wheel 202 and the shaft 204. In other embodiments, the first brake surface 208 may be free to move axially along the shaft 204, and/or may rotate independently of the scroll wheel 202 and/or the shaft 204. The first brake surface 208 shown comprises a coding 212 and a contacting surface 216, both of which are described later with respect to FIG. 3.

Referring still to FIG. 2, an actuator 220 is shown. The actuator 220, shown, comprises an electromagnetic brake. In other embodiments, the actuator 220 may comprise other types of brakes, such as magnetic particle, magnetorheologic, electrorheologic, magnetic, or piezo-electric brakes, and/or may comprise an active actuator, such as a DC motor. The actuator 220 shown comprises a second brake surface 224, an actuator surface 226 that defines a cavity 228, a magnetic core 232, and an electromagnetic coil 236. The actuator 220 in FIG. 2 is not free to rotate (although in other embodiments it may rotate). In the embodiment shown in FIG. 2, the actuator 220 is not free to move axially with respect to the shaft 204. In one embodiment, the actuator 220 may move axially with the shaft 204. In other embodiments, the actuator 220 may move axially with respect to the shaft 204. In one such embodiment, the second brake surface 224 may move in the axial direction of the shaft 204 in order to contact the first brake surface 208.

In the embodiment shown, the second brake surface 224 comprises a broken ring around the top surface of the electromagnetic core 232. In other embodiments the second brake surface 224 may be separate from the actuator 220, and may comprise other shapes, such as a complete ring, a rectangle, a triangle, and a polygon. The second brake surface 224 shown is configured to contact the contacting surface 216 of the first brake surface. In one embodiment, the second brake surface 224 may be configured to separate from the contacting surface 216 when the actuator is activated. In the embodiment shown, the second brake surface 224 is substantially concentric with the first brake surface 208. In other embodiments, the actuator 220, and/or the second brake surface 224 may be substantially non-concentric with the first brake surface 208. In one such embodiment, the second brake surface may be configured to contact a portion of the first brake surface 208 substantially offset from the shaft 204. In the embodiment shown, the second brake surface 224 is configured so as not to contact the coding 212 of the first brake surface 208. In other embodiments, the second brake surface 224 may contact the coding 212 when the actuator 220 is actuated.

In the embodiment shown in FIG. 2, when the electromagnetic coil 236 receives a current, it provides a magnetic attractive force to the electromagnetic core 232. The electromagnetic core 232 may then exert the magnetic attractive force on the first brake surface 208. The magnetic attractive force may force the first and second brake surfaces 208, 224 together with a normal force. Contact between the second brake surface 224 and the contacting surface 216 may cause a resistance to movement of the scroll wheel 202. In one embodiment, the actuator 220 may produce a haptic effect by increasing and/or decreasing the resistance to movement between the first and second brake surfaces 208, 224. Such a resistance may cause the scroll wheel 202 to stop or may exert a force the user can overcome. In one embodiment, the actuator 220 may be configured to produce a haptic effect by forcing the first and second brake surfaces 208, 224 into contact with each other and/or apart. In another embodiment, a spring mounted between the first brake surface 208 and the electromagnetic core 232 of the actuator 220 may cause the two elements to separate when the electromagnetic coil 236 is not energized. In one such embodiment, when the electromagnetic coil 236 receives a pulsed current, a haptic effect in the form of a vibration may be created.

Embodiments of the present invention may utilize various other active and/or resistive actuators as well. For example, in one embodiment, an active actuator may provide resistive effects. In one such embodiment, a DC motor in communication with a manipulandum may be short-circuited or may act as a generator, causing a resistance to the turning of a drive shaft in communication with the motor. In an embodiment in which a motor is set up as a generator, the motor can generate current back to a power supply during certain resistive effects, such as braking effects and/or damping effects.

Other embodiments of the present invention may utilize a piezo-electric actuator. In a piezo-electric actuator, a voltage may be applied to a piezo-ceramic, causing the crystals to elongate and thereby changing the shape of the material. A change in shape of a piezo-ceramic material may be used to provide a mechanical force. In some embodiments, a material shape change of a piezo-ceramic may be relatively small and some type of amplification may be utilized to provide a mechanical force.

For instance, in one embodiment, a piezo-electric actuator may comprise a piezo-ceramic element shaped like a capital "C" of the English alphabet. The two terminus points of the "C" each may be fixed and connected to a voltage regulator. The outside surface of the "C" shaped piezo-ceramic element may comprise a second brake surface, and a first brake surface may comprise an inner surface of a cylindrical ring around the "C" shaped piezo-electric actuator. When a sufficient voltage is applied to the piezo-electric actuator, the two fixed terminus points may remain in place, but the rest of the "C" shaped piezo-ceramic element may grow as the crystals elongate. When the "C" shaped piezo-ceramic element grows, the second surface may be brought into contact with the first brake surface, and may create a resistance to the turning of the first brake surface around the actuator. A sensing device may be placed in a cavity defined by an actuator surface between the two terminus points of the "C" shaped piezo-ceramic element. The first brake surface may comprise a coding from which a sensor on the sensing device may sense the relative movement between the first brake surface and the sensing device. In other embodiments, the sensing device may be capable of sensing the relative movement between the first and second brake surfaces, and/or between the second brake surface and the sensing device. For example. FIG. 7 shows an embodiment of the present invention, similar to the embodiment shown in FIG. 2. However, the embodiment shown in FIG. 7 incorporates a piezo-electric element 237, such as the piezo-electric element described above, instead of an electromagnetic coil.

One embodiment of the present invention may comprise a controller (not shown), such as a processor, that may control the application of current generated by a power supply (not shown) to the electromagnetic coil 236 shown in FIG. 2. Processors can comprise, for example, digital logical processors capable of processing input, executing algorithms, and generating output as necessary to create the desired tactile sensations in the input device in response to an input received from an input device. Such controllers may comprise a microprocessor, an Application Specific Integrated Circuit (ASIC), and state machines.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other forms of computer-readable media may transmit or carry instructions to a computer, such as a router, private or public network, or other transmission device or channel. The processor, and the processing, described may be in one or more structures, and may be dispersed through one or more structures. The processor may comprise code for carrying out one or more of the methods (or parts of methods) described herein.

A controller according to the present invention may be capable of generating a variety of haptic effects. For example, a controller may create effects, such as detents, between entries in the address book application described with reference to FIG. 1. The controller may create additional effects as well, comprising, for example, bumps, vibrations and barriers by applying various currents to the electromagnetic coil 236.

Some of the elements of the embodiment shown in FIG. 2 may be housed in a housing. In other embodiments, the device may be assembled without such a housing, or the housing may house greater or fewer of the device's elements. The housing shown comprises an upper housing portion 248, and a housing base 252. The upper housing portion 248 and the housing base 252 may be fashioned from a non-magnetic material, such as a plastic, to avoid interference with the operation of the electromagnetic actuator 220. In other embodiments, the upper housing portion 248 and/or the housing base 252 may be fashioned from other materials, such as a magnetic material. The housing base 252 may be fixably fastened to a surface, and/or mechanically grounded using any conventional method of fastening, such as adhesives, screws, and collet-pins. The housing base 252 shown is configured to secure and prevent rotation of the upper housing portion 248, and to restrict the rotation of the actuator 220. In other embodiments, the housing base 252 may be configured to allow the rotation of the actuator 220 and the sensing device 240. The housing base 252 shown is configured to securely receive the sensing device 240. The housing base 252 shown is further configured to receive a bronze bushing 254. The bronze bushing 254 is configured to receive the terminal point of the shaft 204. The bronze bushing 254 is further configured to permit the shaft 204 to rotate, and to constrain the movement of the shaft 204 axially. In one embodiment, a spring may be mounted between the bronze bushing 254 and the actuator 220 to keep the first and second brake surfaces 208, 224 in contact.

Figure 3:
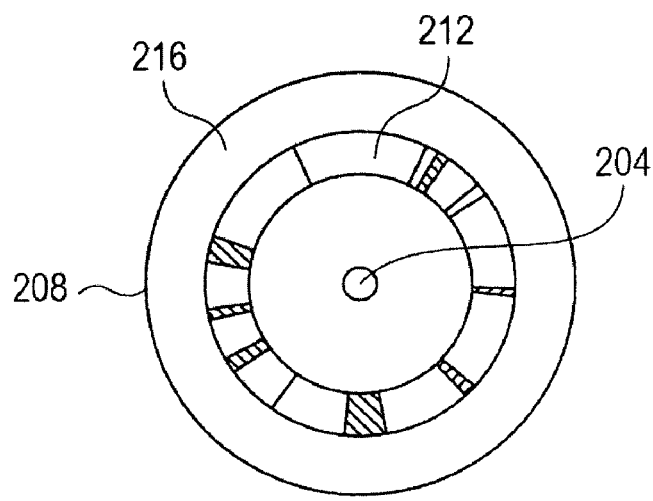
FIG. 3 is a plan view of a first brake surface according to the embodiment shown in FIG. 2.

Referring now to FIG. 3, the first brake surface 208 that faces the second brake surface 224 when the device shown in FIG. 2 is assembled is shown. The first brake surface 208 comprises the coding 212 and the contacting surface 216. The contacting surface 216 shown comprises a ring around the circumferential edge of the first brake surface 208, and is configured to be the sole portion of the first brake surface 208 that contacts the second brake surface 224. In other embodiments, other portions of the first brake surface 208 may be configured to contact the second brake surface 224. For instance, the coding 212 may be configured to contact the second brake surface 224.

The coding 212 in the embodiment shown comprises a ring of markings printed on the first brake surface 208. The coding 212 may comprise, for example, a series of light and dark markings capable of being distinguished by an optical sensor. In other embodiments, the coding 212 may comprise other types and configurations, such as one or more symbols, markings, etchings, holes, depressions, material additions, magnetized strips, or any other type of identifier that may help convey the relative movement or location of the first brake surface 208, and/or the relative movement or location of the second brake surface 224. The coding 212 may be provided using a variety of different processes. For example, the coding 212 may be deposited on, drawn on, ground into, melted into, or affixed to the first brake surface 208.

Figure 4:
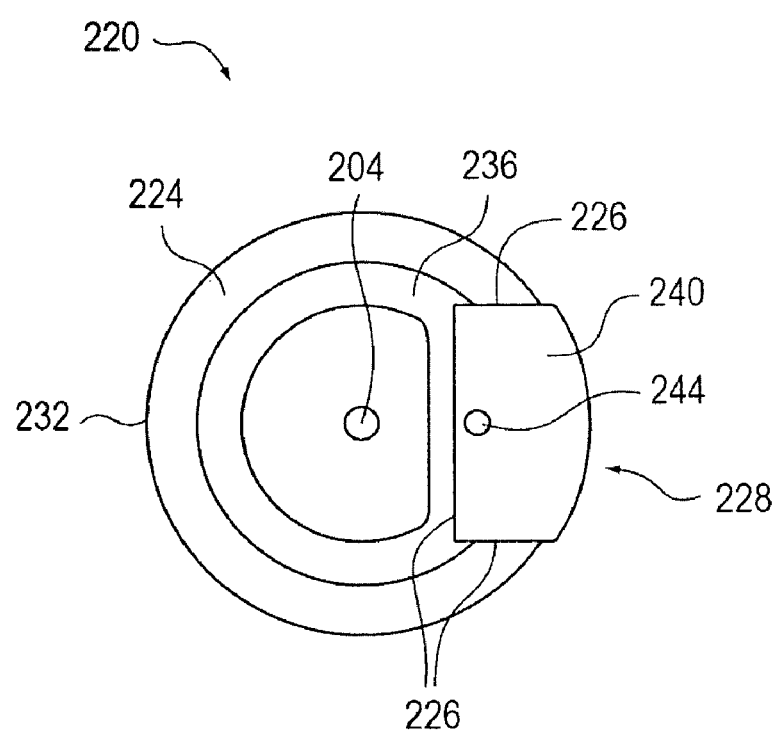
FIG. 4 is a plan view of an actuator according to the embodiment shown in FIG. 2.

The coding 212 in the embodiment shown in FIG. 3 comprises information from which a sensing device 240 (as shown in FIGS. 2 and 4) may be capable of sensing the relative movement between the first brake surface 208 and the sensing device 240. In another embodiment, the sensing device may be capable of sensing a relative movement between the first brake surface 208 and the second brake surface 224, and/or the relative movement between the second brake surface 224 and the sensing device. In one such embodiment, the sensing device 240 may be attached to the second brake surface 224.

The sensing device 240 may communicate to the processor device the relative movement between the first brake surface 208 and the sensing device 240 in a sensor output signal. From the sensor output signal, the processor device may be able to ascertain the position of the scroll wheel 202 in communication with the first brake surface 208. For example, the scroll wheel 202 may rotate with the first brake surface 208. The processor device may be in communication with an I/O port connected to a power supply (not shown). In response to receiving the sensor output signal from the sensing device 240, the processor device may send a feedback control signal in the form of an electrical current generated by the power supply to the electromagnetic coil 236 to create a desired haptic effect.

Referring now to FIG. 4, the cavity 228 defined by the actuator surface 226 in the actuator 220 is shown. The actuator surface 226 shown comprises a portion of the perimeter of the actuator 220, and is adjacent the sensing device 240. The cavity 228 shown comprises a volume configured to receive the sensing device 240. In the embodiment shown, the sensing device 240 substantially fills the cavity 228 of the actuator 220, but in other embodiments, the cavity 228 may be substantially larger or smaller in volume than the sensing device 240. The actuator surface 226 is configured to be adjacent the sensing device 240 when the sensing device 240 is inserted into the cavity 228.

The illustrative actuator 220 shown comprises a substantially cylindrical shape, and a substantially circular cross-section. In other embodiments, the actuator 220 may comprise other shapes and cross-sections, such as rectangular, triangular, and polygonal. In the embodiment shown, the actuator surface 226 and the cavity 228 thereby defined are located proximate to the circumference of the substantially cylindrical actuator 220. In other embodiments, the actuator surface 226 and the cavity 228 may be located elsewhere in the actuator 220, such as within the interior of the actuator 220, not proximate to the circumference of the actuator 220. As shown in FIG. 2, the cavity 228 defined by the actuator surface 226 shown extends fully through the depth of the magnetic core 232 of the actuator 220. In other embodiments, the cavity 228 may extend only partly through the depth of the actuator 220.

Referring still to FIG. 4, the illustrative electromagnetic coil 236 of the actuator 220 is shown. The electromagnetic coil 236 comprises a shape analogous to a capital letter "D" of the English alphabet. The electromagnetic coil 236 comprises a substantially cylindrical shape with a flattened portion configured to be adjacent the sensing device. In the embodiment shown, the flattened portion skirts the actuator surface 226 of the electromagnetic core 232 of the actuator 220. When the sensing device 240 is inserted fully into the cavity 228, adjacent the actuator surface 226 as shown, the flattened portion of the electromagnetic coil 236 also skirts the inserted sensing device 240, so that the electromagnetic coil 236 is adjacent the sensing device 240 without causing mechanical interference. In other embodiments, the actuator surface 226 defining the cavity 228 and the sensing device 240 may be located within the periphery formed by the electromagnetic coil 236.

The sensing device 240 shown in FIG. 4 comprises a sensor 244 capable of sensing the coding 212 of the first brake surface 208. The sensor 244 may comprise, for example, an optical sensor capable of sensing light and dark markings, such as the series of markings that comprise the illustrative coding 212. As shown in FIG. 3, the coding 212 of the first brake surface 208 is configured to form a ring around the underside of the first brake surface 208 of substantially the same outer and inner diameter as the rounded portion of the magnetic coil 236.

Referring still to FIG. 4, the actuator surface 226 defining the cavity 228 shown is configured such that the sensor 244 of the sensing device 240 may be located substantially beneath a portion of the coding 212 that appears as the first brake surface 208 rotates past the flattened portion of the magnetic coil 236, exposing the portion of the coding 212 that is substantially above the cavity 228 to the sensor 244. The flattened portion of the magnetic coil 236 that skirts the actuator surface 226 and the cavity 228 is substantially not overlapping with the coding 212, allowing the sensor 244 of the sensing device 240 an unobstructed line of sight to the exposed portion of the coding 212 on the first brake surface 208.

Various methods and devices utilizing embodiments of the present invention may be employed. For example, a device may comprise a first brake surface, a second brake surface configured to contact the first brake surface, and an actuator configured to exert a force on at least one of the first and second brake surfaces to produce a haptic effect. The actuator may be configured to produce the haptic effect by at least one of increasing and decreasing the resistance to movement between the first and second brake surfaces. In one embodiment, the actuator may be configured to produce the haptic effect by at least one of forcing the first and second brake surfaces into contact with each other and forcing the first and second brake surfaces apart.

The force may be directed normal to at least one of the first and second brake surfaces. For example, in one embodiment, the actuator may be configured to exert a normal force on the first brake surface to increase or decrease a friction force between the first and second brake surfaces that may cause a resistance to a movement of the first brake surface with respect to the second brake surface. In another embodiment, the actuator may be configured to separate the first and second brake surfaces to allow the first brake surface to move with respect to the second brake surface.

The actuator may comprise an electromagnetic actuator, such as an electromagnetic brake. In one such embodiment, the first brake surface may comprise a magnetic element, such as a steel disk. An electromagnetic brake actuator may comprise an electromagnetic core and an electromagnetic coil. For example, the electromagnetic core may be fashioned from steel, and the electromagnetic coil may be fashioned from copper. The second brake surface may comprise an incomplete ring of substantially flat surface area at the top of a steel electromagnetic core. Such a device may be capable of producing a wide variety of haptic effects, comprising bumps, barriers, and vibrations.

An actuator according to one embodiment of the present invention may comprise an actuator surface defining a cavity. The cavity may be configured to receive a sensing device. For instance, the cavity may be located proximate the circumference of an electromagnetic core of an otherwise substantially cylindrical electromagnetic brake actuator. An electromagnetic coil of such an actuator may be configured to avoid mechanical and/or electromagnetic interference with the sensing device. In one embodiment, a magnetic core may be configured to receive a substantially cylindrical electromagnetic coil comprising a flattened portion configured to be adjacent a sensing device. For example, the electromagnetic coil may skirt the cavity and/or the sensing device. In another embodiment, the electromagnetic coil may be configured to surround the sensing device. For example, in one such embodiment, the actuator surface defining the cavity and the sensing device may be located in the interior of the actuator, and may be configured to be surrounded by a substantially-circular electromagnetic coil.

A device according to the present invention may further comprise a manipulandum in communication with the first and/or second brake surfaces. The manipulandum may comprise, for example, a scroll wheel fixably attached to a shaft, wherein the shaft may be fixably attached to either the first or the second brake surfaces. Other embodiments may comprise other types of manipulanda, comprising buttons, knobs, switches, joysticks, and trackballs. A user of the device may use the manipulandum to communicate with the device. For instance, the user may scroll through a list of contacts on a PDA device using a scroll wheel manipulandum by rotating the scroll wheel.

A first brake surface of a device according to the present invention may comprise a coding. The coding may comprise information from which the sensing device may be capable of sensing the relative movement between the first brake surface and the sensing device, and the position of a manipulandum attached to the first brake surface. For example, the coding may comprise a series of markings printed on the first brake surface and visible to a sensing device configured to fit into a cavity defined by an actuator surface and located in an actuator. The sensing device may be configured to sense the coding. For instance, the sensing device may comprise an optical reader capable of sensing light and dark markings on the first brake surface. The sensing device may be affixed to a stationary housing, and may have a substantially unobstructed line of sight to the coding on the first brake surface. For instance, in one embodiment there may not be any physical obstructions between an optical sensor located in the sensing device and a portion of the coding of the first brake surface.

In one embodiment, the sensing device may be affixed to the second brake surface, and the sensing device may be capable of sensing a relative movement between the first and second brake surfaces, and the position of an attached manipulandum. In another embodiment, the sensing device may be affixed to a housing, and may be capable of sensing the relative movement of the second brake surface with respect to the sensing device. A coding may comprise a series of light and dark markings on a circular first brake surface capable of rotation. The light and dark markings may each be unique, allowing the optical sensor to determine the degree of relative rotation of the first brake surface with respect to a stationary second surface.

The first brake surface may further comprise a contacting surface. For example, in one embodiment, the contacting surface may be adjacent the coding. The contacting surface may be configured to contact the second brake surface when the first and second brake surfaces are in contact. The contacting surface may comprise a complete or an incomplete ring of exposed material having a coefficient of friction such that when an actuator exerts a normal force on the first brake surface, the friction force that results from contact between the contacting surface of the first brake surface and the second brake surface may slow or stop a movement between the first and second brake surfaces. An example of a contacting surface may comprise an incomplete protruding steel ring on the first brake surface. The coding of the first surface may be configured not to contact the second brake surface when the first and second brake surfaces are in contact. For example, the coding may comprise a substantially circular ring of largest outer diameter "d," where "d" is lesser than the inner diameter of a substantially circular ring-shaped second brake surface.

In one embodiment, the actuator may further comprise a magnetic core. The magnetic core may be fashioned from any magnetic material. For instance, the magnetic core may be fashioned from steel. The cavity defined by the actuator surface of the actuator may be located within the magnetic core of the actuator. In one such embodiment, the actuator may further comprise an electromagnetic coil. The electromagnetic coil may be fashioned from any material capable of conducting current. For instance, the electromagnetic coil may be fashioned from copper. The electromagnetic coil may be configured to skirt a sensing device that is inserted into the cavity of the actuator. An inserted sensing device may be adjacent the actuator surface of the actuator that defines the cavity configured to receive the sensing device. Both the electromagnetic coil and the sensing device may be housed within the electromagnetic core, and may be free from mechanical interference with each other. In one embodiment in which the actuator comprises a magnetic core, the first brake surface may be fashioned from a magnetic material. For instance, the first brake surface may be fashioned from steel, and may comprise a substantially flat circular disk.

In one embodiment, a device according to the present invention may further comprise a processor in communication with the sensing device and the actuator. The processor may be configured to provide haptic feedback. The processor may receive a sensor output signal from the sensing device. For instance, a sensor output signal may comprise information about the relative movement between the first brake surface and the sensing device, the relative movement between the first and second brake surfaces, the relative movement between the second brake surface and the sensing device, and/or the position of the manipulandum. The processor may send a feedback control signal to the actuator in response to the sensor output signal. For instance, the feedback control signal may comprise an electrical current. The processor may be in communication with an I/O port and a power supply.

A device incorporating the present invention may comprise a housing. The housing may enclose at least one of the elements of such a device. The housing may be fashioned from a wide variety of materials, and may be fabricated using a variety of methods. For instance, the housing may be fashioned from a plastic and may be fabricated using an injection molding technique. The housing may comprise an electronic device housing. Examples of electronic device housings comprise a mobile telephone housing, a personal data assistant housing, and a remote control housing. In one embodiment, the housing may be configured to securely receive a sensing device.

Figure 5:
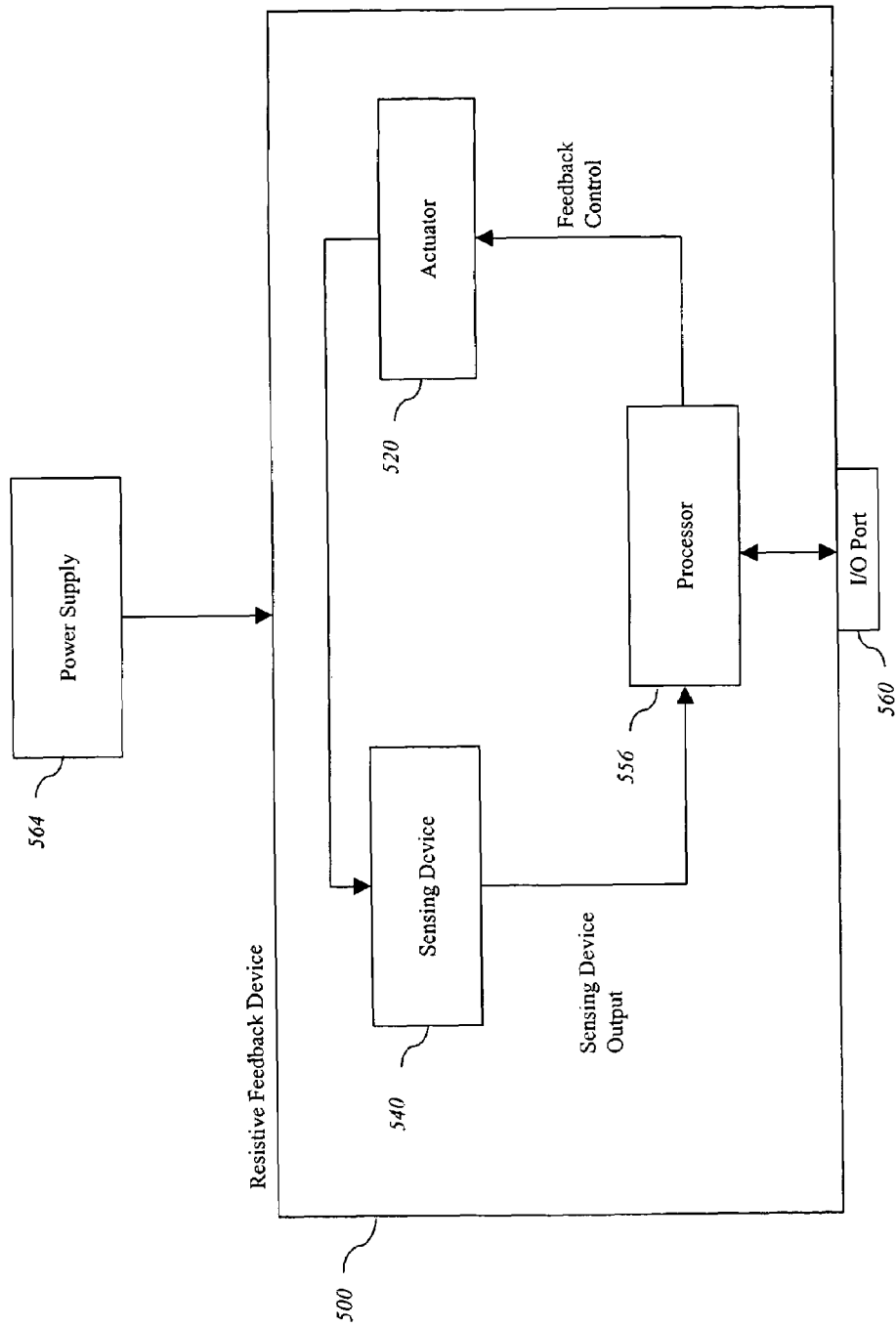
FIG. 5 is a block diagram, illustrating one embodiment of a resistive feedback device according to the present invention.

FIG. 5 is a block diagram, illustrating one embodiment of a resistive feedback device according to the present invention. In the embodiment shown, the resistive feedback device 500 comprises a sensing device 540. The sensing device 540 may comprise one of the sensors discussed in relation to FIGS. 2-4 or various other types of sensors. The device 500 also comprises an actuator 520, such as an electromagnetic or piezo-electric brake. The sensing device 540 and the actuator 520 shown are both in communication with a processor 556. The processor 556 may receive sensor information in the form of a sensor output signal from the sensing device 540, may perform control algorithms, and may provide feedback control signals to the actuator 520.

The device shown in FIG. 5 further comprises an input/output (I/O) port 560, such as a game port, for performing bi-directional communication with external devices utilizing an embodiment of the present invention. In the embodiment shown, the device 500 receives power from an external power supply 564. In other embodiments, power may be supplied through the I/O port 560 or by utilizing an internal power supply. Various embodiments may utilize additional components as well, such as an amplifier to amplify signals to the actuator.

Figure 6:
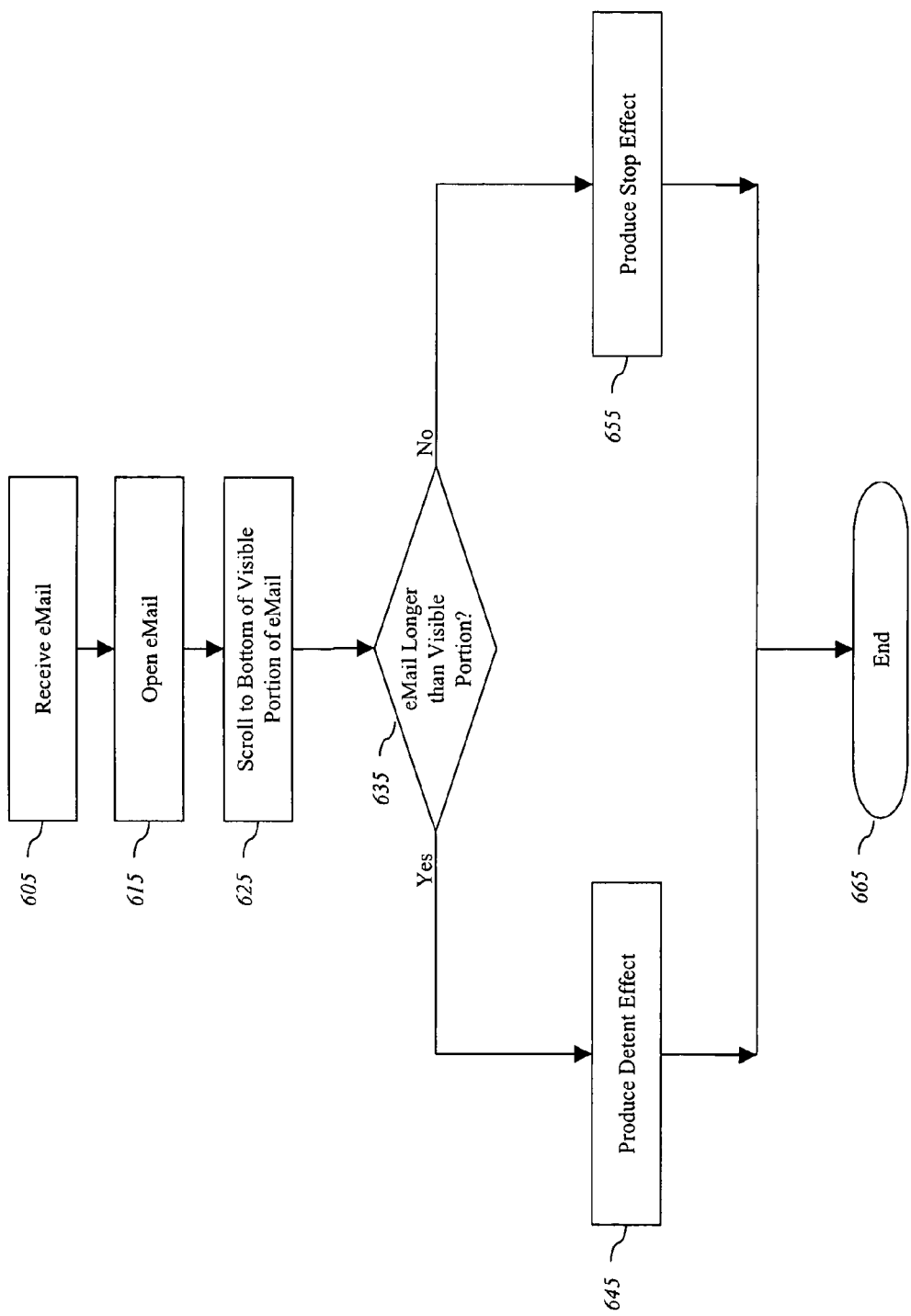
FIG. 6 is a flowchart, illustrating a process of navigating email on a personal digital assistant (PDA) utilizing one embodiment of the present invention.

FIG. 6 is a flowchart illustrating a process of navigating email on a personal digital assistant (PDA) utilizing an embodiment of the present invention. The method illustrated in FIG. 6 is described with reference to PDA (100) shown in FIG. 1. The PDA (100) comprises a scroll wheel (106) manipulandum. For example, the scroll wheel (106) may be the scroll wheel of FIGS. 2–4 (202). The user of the PDA (100) receives an email 605.

The user then utilizes an interface device, such as button (104), to open the email 615. Using the scroll wheel (106), the user then scrolls to the bottom of the email displayed on the PDA screen (102) 625 by turning the scroll wheel (106). A sensor (244) of a sensing device (240) senses a coding (212) on a first brake surface (208) in communication with the scroll wheel (106) as described with respect to FIGS. 2–4 when the user turns the scroll wheel. From the coding (212), the sensing device (240) is able to ascertain the relative movement of a first braking surface (208) with respect to the sensing device (240) and therefrom the position of the first brake surface (208). The sensing device (240) sends the sensed information in a sensing device output signal to a processor.

The PDA screen (102) may or may not be large enough to display the received email. If the email is longer than the visible portion of the screen (102) 635, the processor that received the sensing device (240) output signal communicates with an actuator (220) as described with respect to FIGS. 2–4 by sending a feedback control signal. The feedback control signal may comprise an electric current supplied by a power supply to the actuator (220). The electromagnetic coil (236) of the actuator (220) may receive the feedback control signal sent by the processor and may cause a detent effect on the scroll wheel (106) by turning the electromagnetic core (232) into an electromagnet and thereby exerting a normal force on the first brake surface (208) that causes a resistance to movement between the first and second brake surfaces (208, 224).

The contact of the first and second brake surfaces (208, 224) creates a resistance to the movement of the scroll wheel (106) in communication with the first brake surface (208) over a short interval of time 645. The user can overcome the resistive haptic effect by continuing to scroll down through the email by turning the scroll wheel (106). The effect provides an indicator to the user that the user is scrolling beyond the visible portion of the email message.

Referring still to FIG. 6, if the email is not longer than the visible portion of the screen (102), the processor may send a different feedback control signal to the actuator (220), such as by supplying a stronger electric current to the electromagnetic coil (236), causing the first and second brake surfaces (208, 224) to contact each other with such a great normal force that the first brake surface (208) is substantially difficult to move with respect to the second brake surface (224). This contact may cause a barrier effect in the PDA device (100), comprising a strong resistance to further movement of the scroll wheel (106) 655 by the user. Once the effect has been provided, the process may end 665.

Various other types of effects may be utilized. For example, in one embodiment, the actuator may provide a "bump" when the end of the email is reached. If the user continues to scroll past the bump, the application may display the next email message in the folder of email messages the user is currently viewing.

Embodiments of the present invention may be incorporated into a broad array of devices. For example, a cell phone may incorporate a scroll drum according to this invention for use in navigating a menu structure. A television remote control may also incorporate an embodiment of the present invention for channel navigation, volume control, and other related functions. Similarly, an audio component remote control may utilize an embodiment for volume control or other audio control. A laptop computer may utilize an embodiment for navigation, volume control, or any other function utilizing a scroll wheel, scroll drum, linear slider, or similar user interface device. PDA's, handheld navigation, and handheld email appliances may also benefit from utilizing an embodiment of the present invention.

A camera may utilize an embodiment of the present invention for user control of the focus, f-stop, menu navigation, and other camera-related functions. Since the effects provided by the actuator may be programmable, one manipulandum may be utilized to perform many or all of the functions on the camera. A video recorder may utilize an embodiment of the present invention to provide functions such as shuttle, fast forward, and reverse. An actuator may create detents on a frame-by-frame basis for the shuttle function and hard barriers for fast forward and reverse.

The foregoing description of the embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A device comprising:
a first brake surface;
a second brake surface configured to contact the first brake surface; and an actuator comprising:
an electromagnetic coil having a generally annular shape having an outer periphery with a flattened portion; and
an actuator surface defining a cavity, the cavity configured to receive a sensing device, and
the flattened portion positioned adjacent to the sensing device and where the actuator is configured to exert a force on at least one of the first and second brake surfaces to produce a haptic effect.

2. The device of claim 1, wherein the force is directed normal to at least one of the first or second brake surfaces, and wherein the actuator is configured to produce the haptic effect by at least one of increasing or decreasing the resistance to movement between the first and second brake surfaces.

3. The device of claim 1, wherein the actuator is configured to produce the haptic effect by at least one of forcing the first and second brake surfaces into contact with each other or forcing the first and second brake surfaces apart.

4. The device of claim 1, further comprising a processor configured to be in communication with the sensing device and the actuator.

5. The device of claim 1, wherein the first brake surface comprises a coding.

6. The device of claim 5, wherein the first brake surface further comprises a contacting surface adjacent the coding, the contacting surface configured to contact the second brake surface and the coding configured to not contact the second brake surface.

7. The device of claim 5, wherein the sensing device is configured to sense the coding.

8. The device of claim 5, wherein the coding comprises information from which the sensing device is capable of sensing the relative movement of the first brake surface with respect to the sensing device.

9. The device of claim 1, wherein the sensing device adjacent to the flattened portion is located outside the circumference of the electromagnetic coil.

10. The device of claim 1, wherein the actuator comprises a magnetic core.

11. The device of claim 1, further comprising a housing.

12. The device of claim 1, wherein the first brake surface comprises a magnetic material.

13. The device of claim 11, wherein the housing comprises an electronic device housing.

14. The device of claim 1, wherein the electromagnetic coil is configured to surround the sensing device.

15. The device of claim 1, wherein the electromagnetic coil is configured to skirt the sensing device.

16. The device of claim 13, wherein the electronic device housing comprises at least one of a mobile telephone housing, a personal data assistant housing, or a remote control housing.

17. The device of claim 1, further comprising a manipulandum in communication with at least one of the first brake surface and the second brake surface.

18. A method comprising:
providing a first brake surface;
providing a second brake surface configured to contact the first brake surface; and
providing an actuator comprising:
- an electromagnetic coil having a generally annular shape having an outer periphery with a flattened portion; and
- an actuator surface defining a cavity, the cavity configured to receive a sensing device, and
- the flattened portion positioned adjacent to the sensing device and where the actuator is configured to exert a force on at least one of the first and second brake surfaces to produce a haptic effect.

19. The method of claim 18, wherein the sensing device adjacent to the flattened portion is located outside the circumference of the electromagnetic coil.

20. The method of claim 18, further comprising providing a housing.

21. The method of claim 20, wherein the housing comprises an electronic device housing.

22. The method of claim 21, wherein the electronic device housing comprises at least one of a mobile telephone housing, a personal data assistant housing, and a remote control housing.

23. The method of claim 18, wherein the force is directed normal to at least one of the first or second brake surfaces, and wherein the actuator is configured to produce the haptic effect by at least one of increasing or decreasing the resistance to movement between the first and second brake surfaces.

24. The method of claim 18, wherein the actuator is configured to produce the haptic effect by at least one of forcing the first and second brake surfaces into contact with each other or forcing the first and second brake surfaces apart.

25. The method of claim 18, further comprising providing a processor configured to be in communication with the sensing device and the actuator.

26. The method of claim 18, wherein the first brake surface comprises a coding.

27. The method of claim 26, wherein the first brake surface further comprises a contacting surface adjacent the coding, the contacting surface configured to contact the second brake surface and the coding configured to not contact the second brake surface.

28. The method of claim 26, wherein the sensing device is configured to sense the coding.

29. The method of claim 26, wherein the coding comprises information from which the sensing device is capable of sensing the relative movement of the first brake surface with respect to the sensing device.

30. The method of claim 18, further comprising providing a manipulandum in communication with at least one of the first brake surface and the second brake surface.

31. The method of claim 18, wherein the actuator comprises a magnetic core.

32. The method of claim 18, wherein the electromagnetic coil is configured to skirt the sensing device.

33. The method of claim 18, wherein the first brake surface comprises a magnetic material.

34. The method of claim 18, wherein the electromagnetic coil is configured to surround the sensing device.

35. A device comprising:
a first brake surface;
a second brake surface configured to contact the first brake surface; and
an actuator comprising:
- an electromagnetic coil having a generally annular shape having an inner periphery and an outer periphery, the inner periphery having a flattened portion; and
- an actuator surface defining a cavity, the cavity configured to receive a sensing device, and
- the flattened portion positioned adjacent to the sensing device and where the actuator is configured to exert a force on at least one of the first and second brake surfaces to produce a haptic effect.

36. The device of claim 35, wherein the force is directed normal to at least one of the first or second brake surfaces, and wherein the actuator is configured to produce the haptic effect by at least one of increasing or decreasing the resistance to movement between the first and second brake surfaces.

37. The device of claim 35, wherein the actuator is configured to produce the haptic effect by at least one of forcing the first and second brake surfaces into contact with each other or forcing the first and second brake surfaces apart.

38. The device of claim 35, further comprising a processor configured to be in communication with the sensing device and the actuator.

39. The device of claim 35, further comprising a manipulandum in communication with at least one of the first brake surface and the second brake surface.

40. The device of claim 35, wherein the first brake surface comprises a coding.

41. The device of claim 40, wherein the first brake surface further comprises a contacting surface adjacent the coding, the contacting surface configured to contact the second brake surface and the coding configured to not contact the second brake surface.

42. The device of claim 40, wherein the sensing device is configured to sense the coding.

43. The device of claim 40, wherein the coding comprises information from which the sensing device is capable of sensing the relative movement of the first brake surface with respect to the sensing device.

* * * * *

UNITED STATES PATENT AND TRADEMARK OFFICE
CERTIFICATE OF CORRECTION

| | | |
|---|---|---|
| PATENT NO. | : 7,198,137 B2 | Page 1 of 1 |
| APPLICATION NO. | : 10/902462 | |
| DATED | : April 3, 2007 | |
| INVENTOR(S) | : Neil T. Olien | |

It is certified that error appears in the above-identified patent and that said Letters Patent is hereby corrected as shown below:

Under "DETAILED DESCRIPTION"

Column 4, Line 61, delete the following sentences "For example, FIG. 7 shows and embodiment of the present invention, similar to the embodiment shown in FIG. 2. However, the embodiment shown in FIG.7 incorporates a piezo-electric element 237, such as the pieo-electric element described above, instead of an electromagnetic coil."

Signed and Sealed this

Twenty-sixth Day of June, 2007

JON W. DUDAS
*Director of the United States Patent and Trademark Office*